(12) United States Patent
Lin et al.

(10) Patent No.: US 12,321,066 B2
(45) Date of Patent: Jun. 3, 2025

(54) INTELLIGENT WINDOW

(71) Applicant: BRILLIANT OPTRONICS CO., LTD., Kaohsiung (TW)

(72) Inventors: Tsung-Hsien Lin, Kaohsiung (TW); Cheng-Chang Li, Kaohsiung (TW); Heng-Yi Tseng, Kaohsiung (TW); Hung-Chang Jau, Kaohsiung (TW); Li-Min Chang, Kaohsiung (TW); Kuan-Wu Lin, Kaohsiung (TW)

(73) Assignee: BRILLIANT OPTRONICS CO., LTD., Kaohsiung (TW)

( * ) Notice: Subject to any disclaimer, the term of this patent is extended or adjusted under 35 U.S.C. 154(b) by 0 days.

(21) Appl. No.: 18/286,913

(22) PCT Filed: Oct. 22, 2021

(86) PCT No.: PCT/CN2021/125597
§ 371 (c)(1),
(2) Date: Oct. 13, 2023

(87) PCT Pub. No.: WO2023/065289
PCT Pub. Date: Apr. 27, 2023

(65) Prior Publication Data
US 2024/0192549 A1   Jun. 13, 2024

(51) Int. Cl.
G02F 1/13363 (2006.01)
G02F 1/1337 (2006.01)
G02F 1/1343 (2006.01)

(52) U.S. Cl.
CPC .. *G02F 1/133636* (2013.01); *G02F 1/133746* (2021.01); *G02F 1/134327* (2013.01)

(58) Field of Classification Search
CPC ......... G02F 1/133636; G02F 1/133746; G02F 1/134327
See application file for complete search history.

(56) References Cited

U.S. PATENT DOCUMENTS 11,435,642 B2    9/2022  Lin
2013/0021546 A1*  1/2013  Kikuchi ............... C09K 19/588
                                             556/424

(Continued)

FOREIGN PATENT DOCUMENTS

TW        109139348 A  *  5/2022  ............... E06B 3/66

*Primary Examiner* — Nathanael R Briggs
(74) *Attorney, Agent, or Firm* — WPAT, PC

(57) ABSTRACT

An intelligent window includes two substrates and a dimming layer. Each substrate is electrically connected to a voltage source. A switchable electric field is formed between the two substrates. The dimming layer is formed by filling a liquid crystal material between the two substrates. The liquid crystal material is formed by mixing a chiral molecule, a dichroic dye, and a salt ion in a nematic liquid crystal. A weight percentage concentration of the chiral molecule in the liquid crystal material is determined according to a limitation formula (I). C is the weight percentage concentration, n is a birefringence index of the liquid crystal material, p is a chiral force of the chiral molecule in micrometer$^{-1}$, D is a thickness of the dimming layer in micrometer, $m_1$ is a constant of multiaxial absorption condition in micrometer, and $m_2$ is a constant of normally transparent condition.

$$\frac{n}{4pm_1} \le C \le \frac{m_2}{Dp} \quad \text{(I)}$$

10 Claims, 3 Drawing Sheets

(56) References Cited

U.S. PATENT DOCUMENTS

| | | | |
|---|---|---|---|
| 2022/0146873 A1* | 5/2022 | Lin | E06B 9/24 |
| 2023/0099000 A1* | 3/2023 | Harrold | G02F 1/134327 |
| | | | 345/697 |

* cited by examiner

INTELLIGENT WINDOW

CROSS REFERENCE TO RELATED APPLICATION

The application is a national phase entry of International Application No. PCT/CN2021/125597, filed Oct. 22, 2021, and the entire contents of which are incorporated herein by reference.

BACKGROUND OF THE INVENTION

1. Field of the Invention

The present invention relates to a photoelectric element and, more particularly, to an intelligent window switchable between a transparent state, a light absorption state, and a light scattering state.

2. Description of the Related Art

A conventional window may allow light to pass through to increase indoor lighting or expand view through the window. A conventional intelligent window is switchable between a light absorption mode and a light scattering mode, such that the window does not need a film or a curtain and can serve a plurality of purposes such as light blocking, heat insulation, and view blocking.

The conventional intelligent window described above is limited by its material compatibility and switching conditions, such that the intelligent window with single structure cannot be used for controlling light and be switched between function options of transparency, light absorption, and light scattering. Thus, the conventional intelligent window has a poor dimming effect and limited uses. In addition, though switchable function options can be increased by combining intelligent windows of two different effects, a multi-layer structure of the intelligent window leads to problems such as a thick product, an increased manufacturing cost, and an increased controlling difficulty.

In light of the above, it is necessary to improve the conventional intelligent window.

SUMMARY OF THE INVENTION

To solve the above problem, it is an objective of the present invention to provide an intelligent window, which is simply and quickly switchable between a transparent state, a light absorption state, and a light scattering state.

It is another objective of the present invention to provide an intelligent window, which does not require a multi-layer structure such as a polarizer and is easy to manufacture and operate.

It is still another objective of the present invention to provide an intelligent window, which has an effect of enhancing each switchable functions such as light transmission, light blocking, heat insulation, and light scattering.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

An intelligent window of the present invention includes: two substrates each electrically connected to a voltage source, with a switchable electric field formed between the two substrates; and a dimming layer formed by filling a liquid crystal material between the two substrates. The liquid crystal material is formed by mixing a chiral molecule, a dichroic dye, and a salt ion in a nematic liquid crystal. A weight percentage concentration of the chiral molecule in the liquid crystal material is determined according to a limitation formula $$\frac{n}{4pm_1} \leq C \leq \frac{m_2}{Dp}.$$

C is the weight percentage concentration, n is a birefringence index of the liquid crystal material, p is a chiral force of the chiral molecule (in micrometer$^{-1}$), D is a thickness of the dimming layer (in micrometer), $m_1$ is a constant of multiaxial absorption condition (in micrometer), and $m_2$ is a constant of normally transparent condition.

Thus, the arrangements caused by the chiral force acting on the liquid crystal molecules under different voltages can be controlled through the limitation formula of the chiral molecule concentration of the liquid crystal material. The intelligent window of the present invention can be switchable between a normally transparent state, a multi-direction polarization absorption state, and a scattering state, providing effects of reducing the manufacturing difficulty, simple and quick switching of the light state, and improving the dimming effect.

In an example, the constant of multiaxial absorption condition is 0.56 micrometers, and the constant of normally transparent condition is 0.8. Thus, values of the constant of multiaxial absorption condition and the constant of normally transparent condition may be learned through experimental measurement samples, so that the formula and ratio of the liquid crystal material can be directly calculated, which has the effect of simple and rapid preparation of the liquid crystal material.

In an example, when no voltage is applied to the two substrates, liquid crystal molecules of the liquid crystal material are in a continuous arrangement perpendicular to the two substrates from top to bottom, and the dimming layer is in a transparent state. Thus, the intelligent window can remain transparent most of the time without consuming electricity, which has the effects of saving power and lighting during a power outage.

In an example, when a first voltage is applied to the two substrates, liquid crystal molecules of the liquid crystal material are in a super twisted orientation, the liquid crystal material absorbs incident light in different polarization directions, and the dimming layer is in an absorption state. Thus, the liquid crystal material may be controlled to absorb various polarization components in natural light, which has the effects of increased light blocking and heat insulation.

In an example, the liquid crystal material is mixed with a predetermined dichroic dye to increase an absorption rate of the dimming layer for light at a predetermined wavelength. Thus, the liquid crystal material may selectively absorb light such as visible light or ultraviolet light, which has the effect of selectively isolating harmful light.

In an example, a light absorption rate of the dimming layer is changed by adjusting a magnitude of the first voltage. Thus, the intelligent window may adjust a gray scale of the incident light, which has the effects of adjusting intensity and brightness of transmitted light.

In an example, when a second voltage is applied to the two substrates, the liquid crystal molecules of the liquid crystal material are interfered by the salt ion and are in a discontinuous and chaotic arrangement, the incident light is dispersed in the dimming layer, and the dimming layer is in a scattering state. The second voltage is greater than the first voltage. Thus, the intelligent window may further disperse the incident light and blur an image, which has the effects of generating a blurred field of view and protecting privacy.

In an example, a haze value of the dimming layer is changed by adjusting a magnitude of the second voltage. Thus, the intelligent window may control a scattering phenomenon of the incident light, which has the effects of controlling light transmittance and affecting the degree of blur.

In an example, each of the two substrates includes a conductive layer electrically connected to the voltage source. The conductive layer is made of indium tin oxide, a silver nanowire, or transparent conductive metal. Thus, a proportion of the incident light absorbed by the conductive layer can be reduced, which has the effect of improving a difference between the transparent state and the absorption state.

In an example, each of the two substrates includes an alignment layer. An included angle between a pre-tilt angle of each alignment layer and a plane of the substrate is greater than 85 degrees. The alignment layer is a polyimide film. Thus, the two alignment layers may form a plurality of directionally arranged grooves facing the liquid crystal material, which has the effect of vertically aligning the liquid crystal molecules.

DETAILED DESCRIPTION OF THE INVENTION

In order to make the foregoing and other objectives, features, and advantages of the present invention more apparent and easier to understand, preferred embodiments of the present invention are specifically listed and described in detail below with reference to the accompanying drawings.

Figure 1:
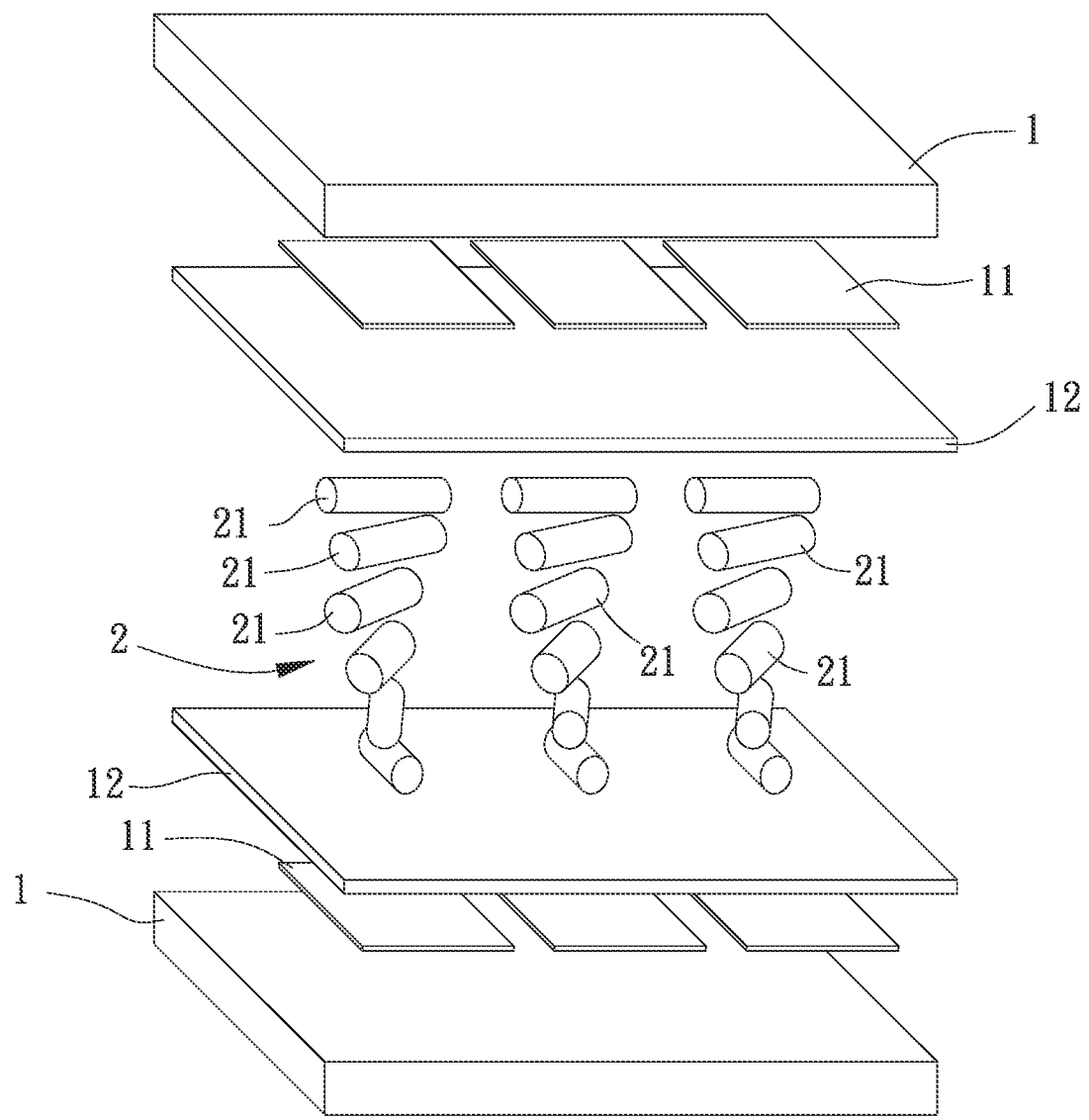
FIG. 1 is an exploded perspective view of a preferred embodiment according to the present invention.

Referring to FIG. 1, FIG. 1 is a preferred embodiment of an intelligent window according to the present invention. The intelligent window includes two substrates 1 and a dimming layer 2. The dimming layer 2 is located between the two substrates 1.

The two substrates 1 are preferably parallel to each other, and the two substrates 1 are preferably made of transparent composite materials, so that light may penetrate the two substrates 1. Each of the two substrates 1 includes a conductive layer 11 and an alignment layer 12. The two conductive layers 11 are electrically connected to a voltage source, forming a switchable electric field between the two substrates 1. In addition, the two alignment layers 12 are respectively located on inner sides of the two substrates 1. An included angle between a pre-tilt angle of each of the alignment layers 12 and a plane of the substrate 1 is greater than 85 degrees. Each substrate 1 may be made of a sealed material, such as glass, acryl, and plastic, and configured to limit a fluid substance between the two substrates 1. The two conductive layers 11 may be made of transparent conductive materials, such as indium tin oxide (ITO), silver nanowire, and transparent conductive metal, and used as electrodes at two ends of the electric field between the two substrates 1. The two alignment layers 12 may be polyimide (PI) films and provide an alignment effect by a plurality of directionally arranged grooves formed on a surface of the two alignment layers 12.

The dimming layer 2 is formed by filling a liquid crystal material 21 between the two substrates 1, so that a thickness D of the dimming layer 2 is a spacing (in micrometer) between the two substrates 1. The liquid crystal material 21 is formed by mixing a chiral molecule, a dichroic dye, and a salt ion in a nematic liquid crystal. The liquid crystal material 21 has an anisotropic medium characteristic, and the chiral molecule has a helical chiral power (HTP). A range of a weight percentage concentration of the chiral molecule in the liquid crystal material 21 is limited by the following formula:

$$\frac{n}{4pm_1} \leq C \leq \frac{m_2}{Dp}$$

in which C is the weight percentage concentration, n is a birefringence index of the liquid crystal material 21, p is the chiral force of the chiral molecule (in micrometer$^{-1}$), $m_1$ is a constant of multiaxial absorption condition (in micrometer), and $m_2$ is a constant of normally transparent condition. Values of the constant $m_1$ of multiaxial absorption condition and the constant $m_2$ of normally transparent condition are learned through experimental measurement of samples, where $m_1$=0.56 micrometers and $m_2$=0.8.

Figure 2A:
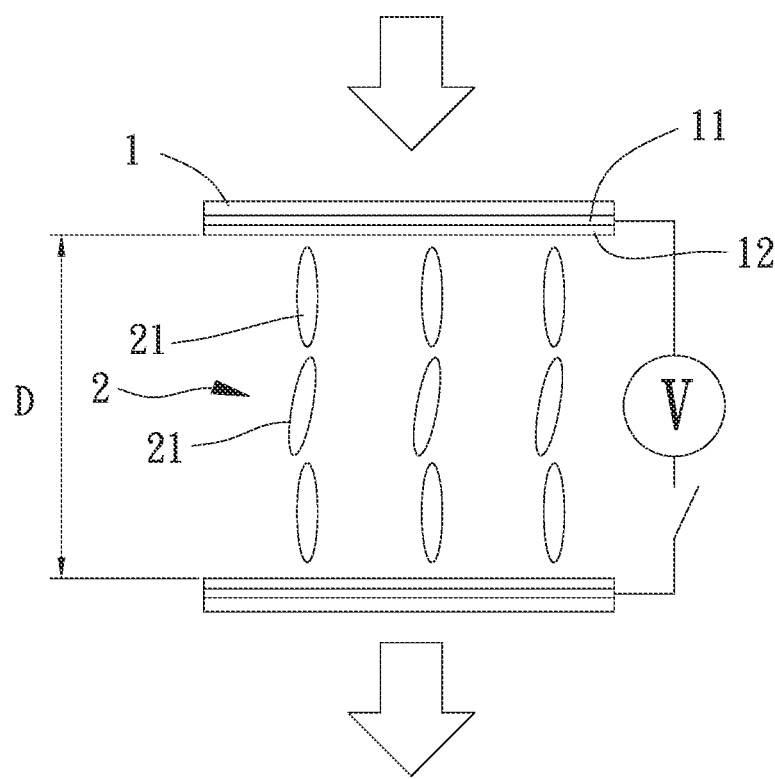
FIG. 2a is a situation diagram of switching of a transparent state according to a preferred embodiment of the present invention.

Referring to FIG. 2a, when no voltage is applied to the dimming layer 2, the two alignment layers 12 act on the dimming layer 2 in a homeotropic alignment respectively on an upper surface and a lower surface, so that liquid crystal molecules of the liquid crystal material 21 are in a continuous arrangement perpendicular to the two substrates 1 from top to bottom. Incident light may directly pass through the regularly arranged liquid crystal molecules, and the dimming layer 2 is in a transparent state, having effects of transmitting light and providing an open field of view.

Figure 2B:
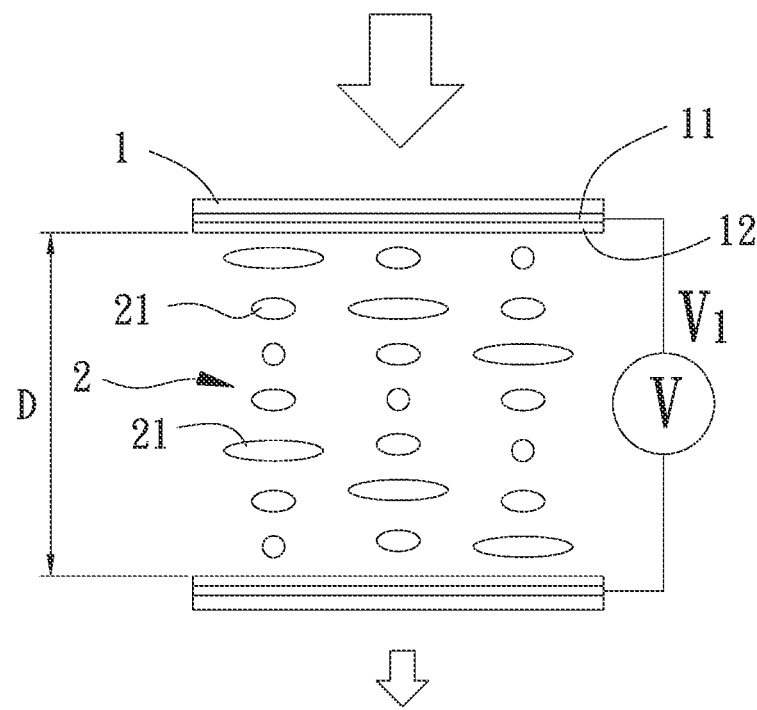
FIG. 2b is a situation diagram of switching of an absorption state according to a preferred embodiment of the present invention.

Referring to FIG. 2b, when a first voltage V1 is applied to the dimming layer 2, the liquid crystal material 21 is subjected to a high twisting power, so that the liquid crystal molecules are in a super twisted orientation. The liquid crystal material 21 may absorb incident light in different polarization directions, and the liquid crystal material 21 mixed with a specific dichroic dye can increase an absorption rate of light at a specific wavelength. Since most of the incident light is absorbed by the liquid crystal material 21, the dimming layer 2 is in an absorption state and has effects of light blocking and heat insulation. In addition, a light absorption rate of the dimming layer 2 may be changed by adjusting a magnitude of the first voltage V1, which provides an effect of adjusting a grayscale of light.

Figure 2C:
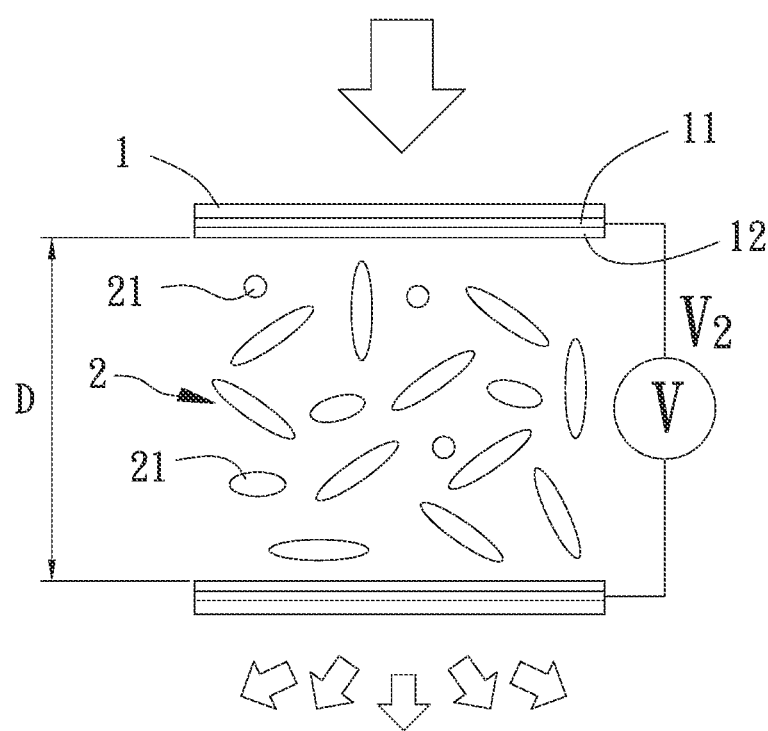
FIG. 2c is a situation diagram of switching of a scattering state according to a preferred embodiment of the present invention.

Referring to FIG. 2c, a second voltage V2 is applied to the dimming layer 2, with the second voltage V2 greater than the first voltage V1. Under a relatively large electric field, an electrohydrodynamic effect is caused since the liquid crystal material 21 includes the salt ion, causing the liquid crystal molecules to be in a discontinuous and chaotic arrangement. The incident light is scattered due to the chaotic arrangement of the liquid crystal molecules and proceeds in different directions. The dimming layer 2 is in a scattering state and has the effects of providing a blurred field of view and protecting privacy. Moreover, different degrees of scattering effects may be presented by adjusting a magnitude of the second voltage V2, which provides an effect of changing a haze value of the dimming layer 2.

During manufacturing of the intelligent window of the present invention, a spacing between the two substrates 1 may be determined first, and types of the nematic liquid crystal and the chiral molecule of the liquid crystal material 21 may be selected. Thus, the thickness D of the dimming layer 2, the birefringence index n of the liquid crystal material 21, and the chiral force p of the chiral molecule may be learned. An appropriate concentration of the liquid crystal material 21 mixed with the chiral molecule may be calculated through the above limitation formula of the constant $m_1$ of multiaxial absorption condition, the constant $m_2$ of normally transparent condition, and the weight percentage concentration C. As a result, the dimming layer 2 has a high transmittance in the transparent state and effectively absorbs multiaxial light in the absorption state, providing effects of simplifying the manufacturing process and improving the dimming effect.

In an embodiment, the thickness D of the dimming layer 2 is 8 micrometers. A negative liquid crystal HNG707700-100 with a birefringence index n of 0.1 and a chiral molecule R811 with a chiral force p of 10 micrometer$^{-1}$ are selected as the liquid crystal materials 21. The above parameters are substituted into the limitation formula of the weight percentage concentration C:

$$\frac{n}{4pm_1} \le C \le \frac{m_2}{Dp},$$

and 0.446%≤C≤1% may be obtained through calculation. The concentration range of the chiral molecule may be determined, and a multi-functional switchable intelligent window can be easily and quickly manufactured.

According to the above, the arrangements caused by the chiral force acting on the liquid crystal molecules under different voltages can be controlled through the limitation formula of the chiral molecule concentration of the liquid crystal material. The intelligent window of the present invention can be switchable between a normally transparent state, a multi-direction polarization absorption state, and a scattering state, providing effects of reducing the manufacturing difficulty, simple and quick switching of the light state, and improving the dimming effect.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims.

What is claimed is:

1. An intelligent window, comprising:
two substrates each electrically connected to a voltage source, wherein a switchable electric field is formed between the two substrates; and
a dimming layer formed by filling a liquid crystal material between the two substrates, wherein the liquid crystal material is formed by mixing a chiral molecule, a dichroic dye, and a salt ion in a nematic liquid crystal, and a weight percentage concentration of the chiral molecule in the liquid crystal material is determined according to a limitation formula $$\frac{n}{4pm_1} \le C \le \frac{m_2}{Dp},$$

wherein C is the weight percentage concentration, n is a birefringence index of the liquid crystal material, p is a chiral force of the chiral molecule in micrometer$^{-1}$, D is a thickness of the dimming layer in micrometer, $m_1$ is a constant of multiaxial absorption condition in micrometer, and $m_2$ is a constant of normally transparent condition;
wherein based on applying the weight percentage concentration of the chiral molecule in the liquid crystal material determined by said limitation formula, different voltages generate different chiral forces acting on the liquid crystal material to have different arrangements rendering the dimming layer switchable among a transparent state, an absorption state and a scattering state;
wherein in the transparent state, liquid crystal molecules of the liquid crystal material are in a continuous arrangement perpendicular to the two substrates from top to bottom;
wherein in the absorption state, the liquid crystal molecules of the liquid crystal material are in a super twisted orientation, and the liquid crystal material absorbs incident light in different polarization directions; and
wherein in the scattering state, the liquid crystal molecules of the liquid crystal material are interfered by the salt ion and are in a discontinuous and chaotic arrangement, the incident light is dispersed in the dimming layer.

2. The intelligent window as claimed in claim 1, wherein the constant of multiaxial absorption condition is 0.56 micrometers, and the constant of normally transparent condition is 0.8.

3. The intelligent window as claimed in claim 1, wherein when no voltage is applied to the two substrates, the dimming layer is in the transparent state.

4. The intelligent window as claimed in claim 1, wherein when a first voltage is applied to the two substrates, the dimming layer is in an absorption state.

5. The intelligent window as claimed in claim 4, wherein the liquid crystal material is mixed with a predetermined dichroic dye to increase an absorption rate of the dimming layer for light at a predetermined wavelength.

6. The intelligent window as claimed in claim 4, wherein a light absorption rate of the dimming layer is changed by adjusting a magnitude of the first voltage.

7. The intelligent window as claimed in claim 4, wherein when a second voltage is applied to the two substrates, the dimming layer is in the scattering state, and wherein the second voltage is greater than the first voltage.

8. The intelligent window as claimed in claim 7, wherein a haze value of the dimming layer is changed by adjusting a magnitude of the second voltage.

9. The intelligent window as claimed in claim 1, wherein each of the two substrates includes a conductive layer electrically connected to the voltage source, and wherein the conductive layer is made of indium tin oxide, a silver nanowire, or transparent conductive metal.

10. The intelligent window as claimed in claim 1, wherein each of the two substrates includes an alignment layer, wherein an included angle between a pre-tilt angle of each alignment layer and a plane of the substrate is greater than 85 degrees, and wherein the alignment layer is a polyimide film.

* * * * *